(12) United States Patent
Tinianov

(10) Patent No.: US 6,968,740 B2
(45) Date of Patent: Nov. 29, 2005

(54) SYSTEMS AND METHODS FOR DETERMINING AN ACOUSTIC AND/OR THERMAL CHARACTERISTIC OF A TARGET MATERIAL

(75) Inventor: Brandon Dillan Tinianov, Littleton, CO (US)

(73) Assignee: Johns Manville International Inc., Denver, CO (US)

(*) Notice: Subject to any disclaimer, the term of this patent is extended or adjusted under 35 U.S.C. 154(b) by 95 days.

(21) Appl. No.: 10/764,897

(22) Filed: Jan. 26, 2004

(65) Prior Publication Data

US 2005/0160820 A1 Jul. 28, 2005

(51) Int. Cl.[7] ............................................. G01K 11/28
(52) U.S. Cl. ............................. 73/645; 73/649; 73/602
(58) Field of Search .......................... 73/645, 649, 589, 73/597, 598, 600, 602, 61.46, 61.47, 30.01, 30.02

(56) References Cited

U.S. PATENT DOCUMENTS

| | | | | |
|---|---|---|---|---|
| 5,741,962 A | * | 4/1998 | Birchak et al. | 73/152.16 |
| 6,367,330 B1 | * | 4/2002 | Schafer | 73/598 |
| 6,435,030 B1 | * | 8/2002 | Gysling et al. | 73/587 |
| 6,698,276 B2 | * | 3/2004 | Povey et al. | 73/61.75 |
| 6,732,575 B2 | * | 5/2004 | Gysling et al. | 73/61.79 |
| 6,752,018 B2 | * | 6/2004 | Goldmeer et al. | 73/589 |

* cited by examiner

*Primary Examiner*—Hezron Williams
*Assistant Examiner*—Jacques M Saint-Surin

(57) ABSTRACT

A system and method for determining an acoustic and/or thermal characteristic of a target material are provided. The system includes an acoustic source arranged to direct a sound wave at a target material; a device for measuring a sound pressure generated by at least the acoustic sensor, to obtain a sound pressure measurement; a density sensor arranged to measure a density of the target material to obtain a density measurement; and an analyzer arranged to receive the sound pressure measurement and the density measurement. The analyzer is capable of determining an acoustic and/or thermal characteristic of the target material based on the sound pressure measurement and/or the density measurement.

31 Claims, 1 Drawing Sheet

SYSTEMS AND METHODS FOR DETERMINING AN ACOUSTIC AND/OR THERMAL CHARACTERISTIC OF A TARGET MATERIAL

BACKGROUND OF THE INVENTION

1. Field of the Invention

The present invention relates to systems and methods for determining an acoustic and/or thermal characteristic of a target material. The present invention also relates to determining an acoustic and/or thermal characteristic of a target material present on a production line.

2. Description of the Related Art

In the construction of residential and commercial buildings, materials can be used to provide thermal and/or acoustic insulation. For example, such materials can be placed in the wall cavities of a building. Materials used to provide thermal and/or acoustic insulation in such applications are known in the art and include, for example, a glass fiber material. Processes and apparatuses for manufacturing such insulation materials are known in the art.

During or after the manufacture of the thermal and/or acoustic insulation material, the manufactured product can be tested in order to ensure that the thermal and/or acoustic characteristics thereof meet particular quality control standards. However, measuring the relevant characteristics of the manufactured product can often be a difficult and/or time consuming task. For example, measuring characteristics of the manufactured product typically requires taking a sample of the product from the production line for testing. The testing of characteristics such as, for example, the effective thermal conductivity of a fiber glass material, can take as long as one-half hour to complete. The interruption in the production process to obtain a portion of the insulation material for testing can be burdensome, and also can have an adverse effect on the efficiency of the overall manufacturing process. In addition, the considerable amount of time normally required to determine relevant characteristics of the manufactured product can further delay production of the material and/or permit the manufacture of non-compliant materials while the sample material is being tested.

The problems discussed above can be ameliorated or overcome by employing exemplary aspects of the present invention. For example, in an exemplary embodiment, acoustic and/or thermal measurements taken in connection with a target material (i.e., the material to be tested) can be obtained without requiring the removal of a sample of the target material. That is, according to exemplary aspects, simultaneous manufacturing of the target material and testing of the characteristics of the target material can be achieved. In addition, exemplary aspects of the present invention can enable the determination of characteristics of the target material within a relatively short period of time.

The present inventor has also recognized that in some cases, it can be beneficial to obtain both acoustic and density measurements in connection with a target material, in order to determine a characteristic of the target material based on such acoustic and density measurements. According to an exemplary embodiment of the present invention, such characteristic based on the acoustic and density measurements can be obtained.

Other aspects of the present invention will become apparent to one of ordinary skill in the art upon review of the specification, drawings and claims appended hereto.

SUMMARY OF THE INVENTION

According to a first aspect of the present invention, a system for determining an acoustic and/or thermal characteristic of a target material is provided. The system comprises:

an acoustic source arranged to direct a sound wave at a target material;

a device for measuring a sound pressure generated by at least the acoustic source, to obtain a sound pressure measurement;

a density sensor arranged to measure a density of the target material to obtain a density measurement; and an analyzer arranged to receive the sound pressure measurement and the density measurement, wherein the analyzer is capable of determining an acoustic and/or thermal characteristic of the target material based on the sound pressure measurement and/or the density measurement.

According to another aspect of the present invention, a method for determining an acoustic and/or thermal characteristic of a target material is provided. The method comprises:

directing a sound wave emitted from an acoustic source at a target material;

measuring a sound pressure generated at least by the sound wave, to obtain a sound pressure measurement;

measuring a density of the target material to obtain a density measurement; and determining an acoustic and/or thermal characteristic of the target material based on the sound pressure measurement and/or the density measurement.

BRIEF DESCRIPTION OF THE DRAWINGS

The objects and advantages of the invention will become apparent from the following detailed description of the preferred embodiments thereof in connection with the accompanying drawings in which.

DETAILED DESCRIPTION OF THE PREFERRED EMBODIMENTS OF THE INVENTION

The present systems and methods provide means for determining an acoustic and/or thermal characteristic of a target material. In an exemplary embodiment, such acoustic and/or thermal characteristic of the target material can be determined while the target material is present on a production line.

Figure 1:
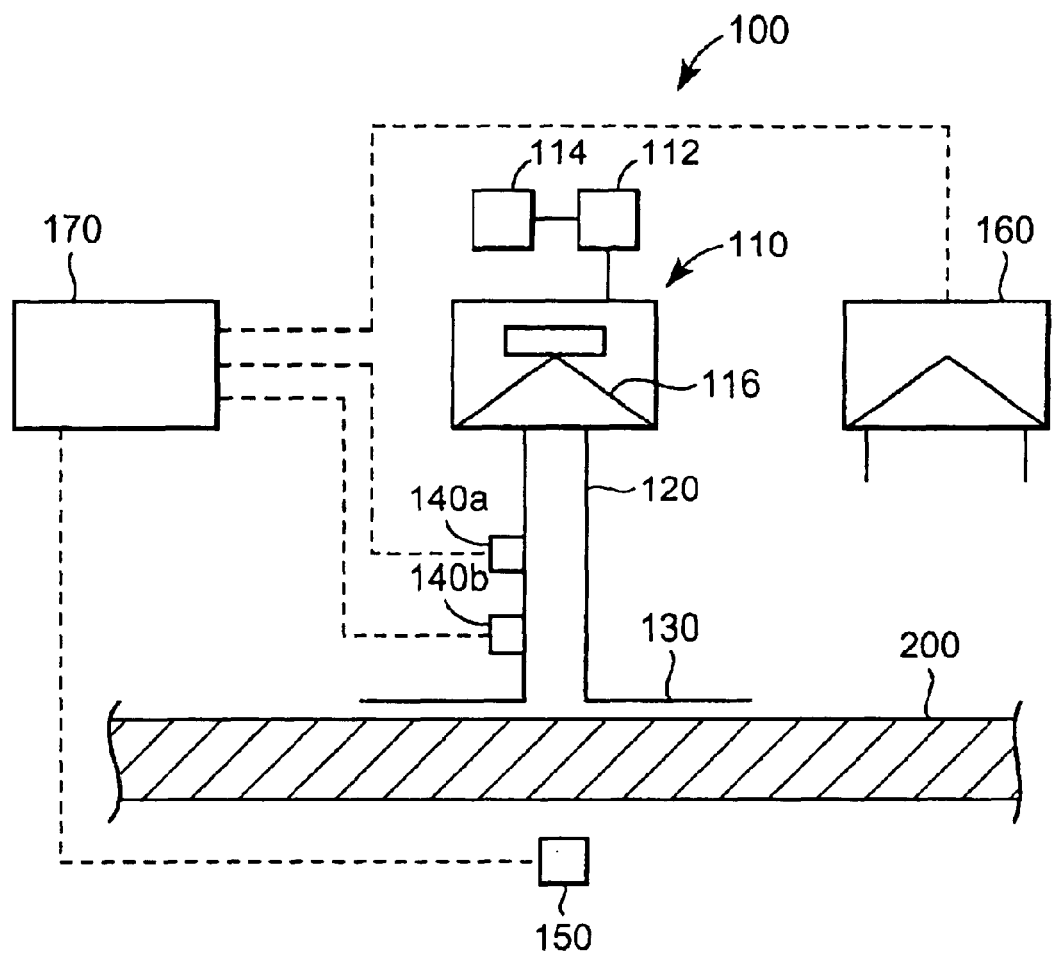
FIG. 1 illustrates an exemplary embodiment of a system for determining an acoustic and/or thermal characteristic of a target material, in accordance with one aspect of the present invention.

Referring to FIG. 1, an exemplary system 100 for determining a characteristic of a target material 200 is shown. The system 100 can include a device 110 for obtaining an acoustic measurement in connection with the target material 200. The system 100 can also include a device 160 for obtaining a density measurement of the target material 200. Using at least the measurements obtained from these two devices 110 and 160, various other characteristics of the target material 200 can be calculated including, for example, the acoustic impedance, the acoustic propagation constant, the airflow resistivity, the effective fiber diameter, the thermal resistivity and in particular, the thermal index. In this manner, exemplary methods and systems in accordance with the present invention can provide means for providing accurate estimates of acoustic and/or thermal characteristics of the target material 200.

The target material 200 can include any material which possesses acoustic and/or density properties which are measurable by the present systems and methods. In an exemplary embodiment, the target material 200 can include a material intended for use in a thermal and/or acoustic insulation application such as, for example, a fiber glass material, mineral wool or rock wool, preferably a fiber glass material. Fiber glass material compositions and processes and systems for manufacturing same which are known in the art can be used in connection with the inventive methods and systems.

The target material 200 can have any shape which enables the measurement of acoustic and density characteristics thereof using the devices 110 and 160. Preferably, the target material 200 can take the form of a flat, elongated material. In an exemplary embodiment, the width of the target material 200 can be from about 4 to about 12 feet, preferably about 8 feet, and the thickness can be from about 4 to about 20 inches. In one embodiment, the target material 200 can have a substantially constant thickness. The target material 200 can be substantially homogeneous, in which case the acoustic and/or density measurement of only a portion of the target material 200 can be substantially representative of the target material 200 as a whole. However, the target material 200 is not limited to being substantially homogeneous, and the degree of homogeneity can depend on the manner in which the target material 200 is produced.

Referring to FIG. 1, the device 110 for measuring an acoustic characteristic of the target material 200 can include an acoustic source 116 arranged to direct a sound wave at the target material 200. For example, the acoustic source 116 can include a speaker which emits a sound wave. The frequency of the sound wave emitted from the acoustic source 116 can be adjusted depending on the particular target material 200. For example, the frequency employed for a target material 200 formed from glass fibers can be from about 500 to about 2,000 Hz. In an exemplary embodiment, a 50 mm high-performance compression driver can be used. Such a compression driver is available from Peavey Electronics Corporation, located in Meridian, Mississippi, as well as B&C Speakers SPA, located in Italy.

The device 110 can also include a signal generator 114 and an amplifier 112 for amplifying the signal provided to the speaker. Any signal generator 114 capable of generating a signal for use in the system 100 can be employed. For example, an analog output card for use with a computer can be used such as a static analog voltage output card, Model No. PCI-6703, available from National Instruments Corporation located in Austin, Tex. An exemplary amplifier 112 which can be used in the system 100 is available from Peavey Electronics Corporation, located in Meridian, Miss., as well as Crown Audio, Inc., located in Elkhart, Ind.

The device 110 can also include a waveguide 120 arranged between the acoustic source 116 and the target material 200, for example, to provide a well controlled sound field for prediction of material characteristics, and/or to assist in isolating the system 100 from noises which may adversely affect the accuracy of measurements being taken. Preferably, one end of the waveguide 120 can be connected to the acoustic source 116 to enable the acoustic source 116 to direct the sound wave in the direction of the length of the waveguide 120, and the other end of the waveguide 120 can terminate proximate to the target material 200.

The waveguide 120 can have any shape suitable for accommodating the passage of the sound wave therethrough. In one embodiment, the waveguide 120 can have an elongated, substantially cylindrical shape defining a lengthwise passage through which the sound wave can travel. The waveguide 120 can possess dimensions which are effective to establish a plane wave acoustic field directed at the target material 200. Establishing a plane wave acoustic field can be beneficial because it can enable measurements to be taken using only two microphones. For example, the inside diameter of the waveguide 120 can be from about 12 to about 100 mm. The length of the waveguide 120 can depend on at least the inside diameter of the waveguide 120 and/or the position of a sound pressure sensor disposed therein, and is preferably at least twelve times the diameter of the waveguide 120. For example, the length of the waveguide 120 can be from about 144 mm to about 2 meters. The waveguide 120 can be formed from any material suitable for accommodating the passage of a sound wave therethrough, preferably, a metal or alloy such as aluminum.

A baffle 130 can be arranged at the end of the waveguide 120 proximate to the target material 200, i.e., the end which is opposite the end connected to the acoustic source 116. The baffle. 130 helps to provide a controlled sound field. For example, the baffle 130 can comprise a substantially circular plate with an aperture at or near the center thereof. The baffle 130 can be connected to the waveguide 120 such that the passage through the waveguide 120 coincides with the aperture, thereby allowing a sound wave to pass through the waveguide 120 and the aperture of the baffle 130. The diameter of the baffle 130 can depend on the frequency of the sound wave emitted from the acoustic source 116 and can be, for example, from about 90 to about 370 mm. The baffle 130 can be in contact with, not in contact with, or very close to the target material 200. For example, the baffle 130 can be arranged within 2 cm from the target material 200. The baffle 130 can be formed from any suitable material including, for example, a metal or alloy such as aluminum [for consistency with the above].

At least one sound pressure sensor can be used to measure a sound pressure generated at least in part by the sound wave emitted from the acoustic source 160. For example, the at least one sound pressure sensor can be used to obtain an acoustic measurement in connection with the target material 200, for example, the sound pressure drop across the target material 200. The at least one sound pressure sensor is preferably capable of measuring sound pressure on a continuous basis.

In one embodiment, at least one first sound pressure sensor 140 can be provided for measuring the sound pressure at a location between the acoustic source 116 and the target material 200. For example, the first sound pressure sensor 140 can be used to estimate the sound pressure and/or velocity at the surface of the target material 200. As shown in FIG. 1, in an exemplary embodiment, a plurality of first sound pressure sensors 140a and 140b can be employed to estimate the sound pressure and/or velocity at the surface of the target material 200.

The first sound pressure sensor 140 can be positioned to measure the sound pressure at a location inside the waveguide 120. For example, the first sound pressure sensor 140 can be arranged in the sidewall of the waveguide 120, for example, flush with the surface of the interior of the sidewall thereof. In an exemplary embodiment, the plurality of first sound pressure sensors 140a and 140b can be arranged by being spaced a distance apart from each other along the length of the waveguide 120, for example, from about 6 to about 170 mm apart.

At least one second sound pressure sensor 150 can be arranged such that the target material 200 is present between the acoustic source 116 and the second sound pressure sensor 150. For example, the second sound pressure sensor 150 can be arranged to measure the sound pressure at a location at a side of the target material 200 that is opposite the side at which the acoustic source 116 is arranged. The second sound pressure sensor 150 can detect the sound wave emitted from the acoustic source 116 which passes through the target material 200, thereby enabling the determination of the sound pressure drop across the target material 200. The second sound pressure sensor 150 can be arranged at a distance from the target material 200 to optimize the detection of the sound passing through the target material 200. For example, the second sound pressure sensor 150 can be arranged from about 2 to about 200 cm from the target material 200.

Any device suitable for measuring sound pressure can be used as the first and second sound pressure sensors 140 and 150 discussed above. In an exemplary embodiment, the sound pressure sensors 140 and 150 can be capable of accurately measuring sound pressure in the presence of a target material 200 in motion. For example, a microphone can be used such as a ¼-inch ICP pressure microphone available from G.R.A.S. Sound and Vibration, located in Vedbaek, Denmark. The sound pressure sensors 140 and 150 can be used with additional devices to enable the system 100 to operate properly in a noisy environment. For example, a phase-sensitive rectifier, a low pass filter and/or a lock-in amplifier can be used to improve signal-to-noise ratios. Such devices can be software driven by software available from National Instruments Corp. located in Austin, Tex., under the trade name LabVIEW.

Referring to FIG. 1, a density sensor 160 can be arranged to remotely measure the density of the target material 200. The density sensor 160 can be arranged upstream or downstream from the acoustic source 116 with respect to the direction in which the target material 200 is conveyed, preferably downstream from the acoustic source 116. In an exemplary embodiment, the density sensor 160 can be arranged at a distance from the target material 200 which enables the density sensor 160 to obtain an accurate density measurement, for example, about 1 meter or less. The density sensor 160 can be fixed or can be moveable to enable measurement of various areas.

Any density-measuring device which is capable of remotely measuring the density of the target material 200 can be used, preferably a device that is suitable for measuring the density of the target material 200 while in motion. The density sensor 160 is preferably capable of taking density measurements on a continuous basis. For example, the Precision Plus Basis Weight Sensor, Model 3-4202-02, available from Honeywell-Measurex Corp. located in Cupertino, Calif., can be used.

The devices 110 and 160 can provide analog signals which can be converted to digital signals to facilitate signal processing. Any suitable means for acquiring the digital signals can be used including, for example, a computer used with a dynamic signal acquisition board, Model PCI-4452, available from National Instruments Corporation. Alternatively, the signals can be processed in analog format.

At least one analyzer 170 can be used which is arranged to receive the sound pressure measurements from the sound pressure sensors 140 and 150. The analyzer 170 can also be arranged to receive the density measurement from the density sensor 160. The sensors 140, 150 and 160 can provide measurements on a continuous basis or an intermittent basis. In one embodiment, the acoustic measurement(s) taken at or during a particular time period can be associated with the density measurement(s) taken at or during the same time period. The association of measurements taken at the same time period can improve accuracy of the prediction of the characteristic of the target material 200.

In a preferred embodiment, the inventive methods and systems are suitable for determining the thermal index (TI) of the target material 200. The thermal index is a measure of the insulative efficiency of the target material, and is a function of the thermal conductivity (k), the density ($\square$) and the thickness (L) of the target material 200. For fiberglass batt products, the thermal index can be calculated based on the following equation:

$$k = 0.18042 + 0.005 + \frac{1.0523}{\frac{1000}{TI} + \frac{1.2222}{L}}$$

The analyzer 170 can process at least one of the measurements to obtain useful information regarding the target material 200. For example, the sound pressure measurements and/or the density measurements can be inputted into a formula or algorithm to obtain an estimate of a characteristic of the target material 200 including, for example, the acoustic impedance, the acoustic propagation constant, the airflow resistivity, the effective fiber diameter, the thermal resistivity and/or the thermal index (as shown above). For example, the sound pressure drop across the target material 200 can be used to predict the thermal conductivity of the target material 200. Techniques for estimating the thermal conductivity based on acoustic measurements are discussed in, for example, Champoux et al, "Measurement of Thermal Resistivity of Insulating Material Using an Acoustical Technique," Noise Control Eng. J., pp. 151–158 (1993), the contents of which are incorporated by reference herein.

The analyzer 170 can include any suitable means for receiving and processing data including, for example computer hardware and/or software. According to an exemplary embodiment, various aspects of the system 100 can be controlled using a single software program run on a computer. For example, the software program can control the generation of a signal to be sent to the speaker. The software program can also be arranged to monitor and control the devices 110 and 160. For example, software available from National Instruments Corporation under the trade name LabVIEW can be used to control various aspects of the system 100.

In an exemplary embodiment, if a particular characteristic of the target material 200 is not at an acceptable level, the analyzer 170 can provide the estimated characteristic value to a controller for controlling at least one process parameter in the process for forming the target material 200. For example, the controller can adjust the at least one process parameter to enable formation of a target material 200 wherein the particular characteristic is at an acceptable level.

Figure 2:
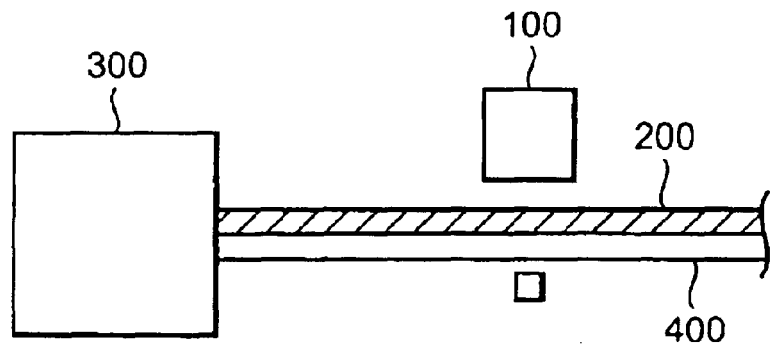
FIG. 2 illustrates an exemplary location of a system for determining an acoustic and/or thermal characteristic of a target material, with respect to a production line for manufacturing the target material, in accordance with another aspect of the present invention.

Referring to FIG. 2, in an exemplary embodiment, the system 100 can be arranged downstream from a system 300 for manufacturing the target material 200, with respect to the direction in which the target material 200 is conveyed. For example, the target material 200 can be transported from the manufacturing system 300 to the measuring system 100 by using a conveyor 400. Any apparatus capable of conveying the target material 200 can be used as the conveyor 400 including, for example, a conveyor belt. Preferably, the conveyor 400 is structured such that it does not obstruct the measurement conducted by the sound pressure sensor 150. This embodiment enables the target material 200 to be analyzed while the target material 200 is present on a production line, i.e., without any need for removing a physical sample of the target material 200 for laboratory testing. In this manner, the characteristics of the target material 200 can be relatively quickly tested, and any necessary changes can be made to the process parameters of the target material manufacturing process.

While the invention has been described with reference to preferred embodiments, it is understood that variations and modifications may be resorted to as will be apparent to those skilled in the art. Such variations and modifications are to be considered within the purview and scope of the invention as defined by the claims appended hereto.

What is claimed is:

1. A system for determining an acoustic and/or thermal characteristic of a target material, comprising:
    an acoustic source arranged to direct a sound wave at a target material;
    a device for measuring a sound pressure generated by at least the acoustic source, to obtain a sound pressure measurement;
    a density sensor arranged to measure a density of the target material to obtain a density measurement; and
    an analyzer arranged to receive the sound pressure measurement and the density measurement, wherein the analyzer is capable of determining an acoustic and/or thermal characteristic of the target material based on the sound pressure measurement and/or the density measurement.

2. The system according to claim 1, wherein the device for measuring the sound pressure comprises at least two sound pressure sensors capable of measuring a sound pressure drop across the target material.

3. The system according to claim 1, wherein the device for measuring the sound pressure comprises:
    at least one first sound pressure sensor arranged to measure a first sound pressure between the acoustic source and the target material; and
    at least one second sound pressure sensor arranged to measure a second sound pressure, wherein the target material is present between the acoustic source and the second sound pressure sensor.

4. The system according to claim 1, wherein a conveyor is arranged to continuously convey the target material through an exposure area, wherein the sound wave directed from the acoustic source is directed at the exposure area.

5. The system according to claim 4, wherein the conveyor is arranged to continuously convey a portion of the target material not previously exposed to the sound wave, to the exposure area.

6. The system according to claim 1, further comprising a waveguide for directing the sound wave at the target material, wherein the waveguide is arranged between the target material and the acoustic source.

7. The system according to claim 6, wherein a first end of the waveguide is connected to a baffle, and a second end of the waveguide is connected to the acoustic source.

8. The system according to claim 7, wherein the target material is not in contact with the baffle.

9. The system according to claim 8, wherein the target material is arranged within 2 cm from the baffle.

10. The system according to claim 6, wherein the device for measuring the sound pressure comprises a first sound pressure sensor arranged in a sidewall of the waveguide.

11. The system according to claim 10, wherein the device for measuring the sound pressure further comprises a second sound pressure sensor arranged from about 2 to about 200 cm from the target material.

12. The system according to claim 1, wherein the target material has a substantially constant thickness.

13. The system according to claim 1, wherein the target material comprises a fiberglass material.

14. The system according to claim 1, wherein the system is located downstream from an apparatus for forming the target material, and wherein the system is arranged to receive a continuous supply of the target material from the apparatus.

15. The system according to claim 1, wherein the system is located on a production line of the target material.

16. A method for determining an acoustic and/or thermal characteristic of a target material, comprising:
    directing a sound wave emitted from an acoustic source at a target material;
    measuring a sound pressure generated at least by the sound wave, to obtain a sound pressure measurement;
    measuring a density of the target material to obtain a density measurement; and
    determining an acoustic and/or thermal characteristic of the target material based on the sound pressure measurement and/or the density measurement.

17. The method according to claim 16, wherein the step of measuring the sound pressure comprises measuring a sound pressure drop across the target material.

18. The method according to claim 16, wherein the step of measuring the sound pressure generated at least by the sound wave comprises:
    measuring a first sound pressure between the acoustic source and the target material; and
    measuring a second sound pressure, wherein the target material is present between the acoustic source and the location at which the second sound pressure is measured.

19. The method according to claim 16, further comprising continuously conveying the target material through an exposure area, wherein the sound wave directed from the acoustic source is directed at the exposure area.

20. The system according to claim 19, wherein a portion of the target material not previously exposed to the sound wave is continuously conveyed to the exposure area.

21. The method according to claim 16, wherein a waveguide for directing the sound wave at the target material is provided, wherein the waveguide is arranged between the target material and the acoustic source.

22. The method according to claim 21, wherein a first end of the waveguide is connected to a baffle and a second end of the waveguide is connected to the acoustic source.

23. The method according to claim 22, wherein the target material is not in contact with the baffle.

24. The method according to claim 23, wherein the target material is arranged within 2 cm from the baffle.

25. The method according to claim 21, wherein a first sound pressure sensor is arranged in a sidewall of the waveguide.

26. The method according to claim 25, wherein a second sound pressure sensor is arranged such that the target material is present between the acoustic source and the second sound pressure.

27. The method according to claim 16, wherein the target material has a substantially constant thickness.

28. The method according to claim 16, wherein the target material comprises a fiberglass material.

29. The method according to claim 16, wherein the acoustic source is located downstream of an apparatus for forming the target material, wherein the system is arranged to receive a continuous supply of the target material from the apparatus.

30. The method according to claim 16, wherein the target material is present on a production line thereof.

31. The method according to claim 16, wherein the steps of measuring a sound pressure and measuring a density of the target material, are conducted simultaneously.

* * * * *